United States Patent [19]

Peacock et al.

[11] Patent Number: 5,259,363
[45] Date of Patent: Nov. 9, 1993

[54] SOLAR ROOFING SYSTEM

[75] Inventors: David W. Peacock; Lee M. Ramsey, both of Tallahassee, Fla.

[73] Assignee: Lolar Logistics, Inc., Chiefland, Fla.

[21] Appl. No.: 812,105

[22] Filed: Dec. 23, 1991

[51] Int. Cl.⁵ .............................. F24J 2/18
[52] U.S. Cl. .................... 126/621; 126/1.28; 126/640; 126/641
[58] Field of Search ............... 126/435, 437, 428, 429, 126/431, 432, 447, 448, 450, 621, 628, 640, 641, 906

[56] References Cited

U.S. PATENT DOCUMENTS

| | | | |
|---|---|---|---|
| 4,174,703 | 11/1979 | Blakey et al. | 126/428 X |
| 4,285,335 | 8/1981 | Simmons, Jr. et al. | 126/448 X |
| 4,296,729 | 10/1981 | Cooper | 126/435 X |
| 4,369,836 | 1/1983 | Bleckmann | 126/447 X |
| 4,426,997 | 1/1984 | Bette et al. | 126/429 X |
| 4,517,958 | 5/1985 | Worf | 126/435 |

*Primary Examiner*—Larry Jones
*Attorney, Agent, or Firm*—Franklin J. Cona

[57] ABSTRACT

A solar roofing panel system for use in residential and commercial buildings employing conventional metal roofing components. The system collects and supplies thermal energy from the sun to heat the interior thereof and also is capable of providing solar generated electricity for powering the normal complement of household appliances. The system can also be adapted to provide a thermal energy source for absorption cooling for commercial applications such as supermarkets or the like. The system employs an air-to-liquid system in the preferred embodiment. The alternative embodiment has an air-to-air heat exchange system.

16 Claims, 6 Drawing Sheets

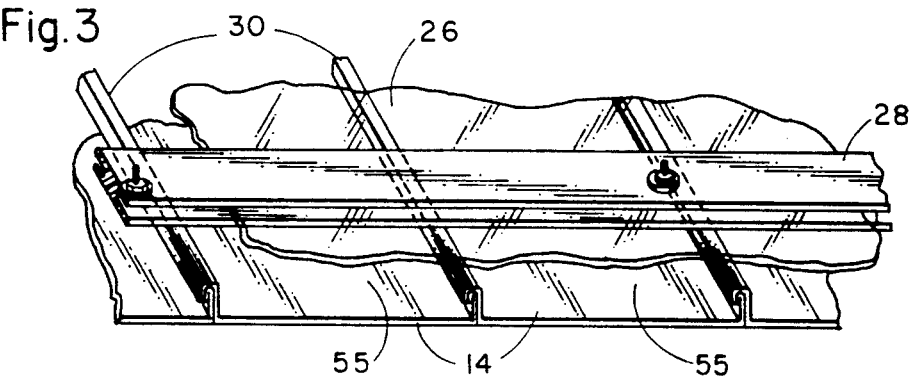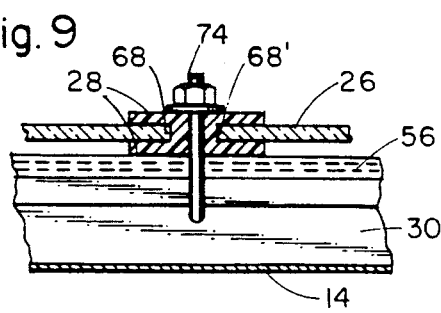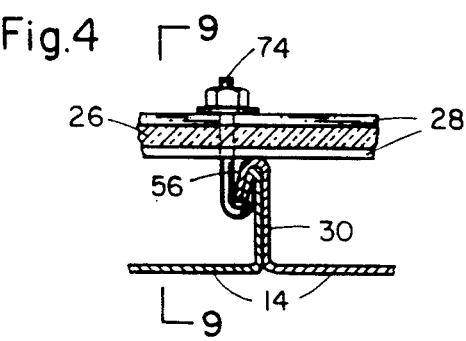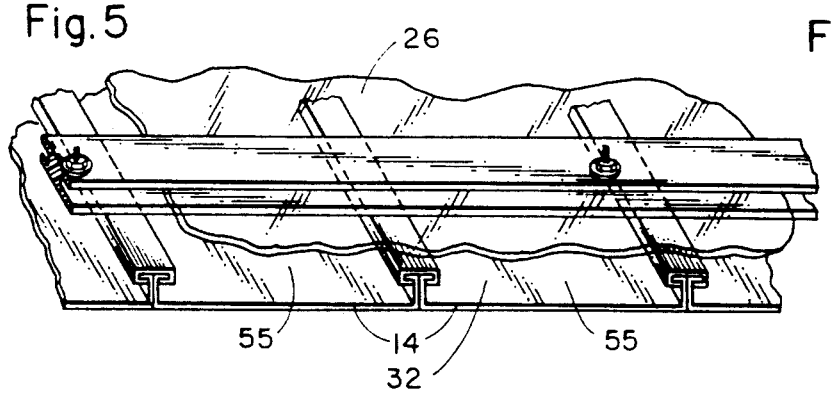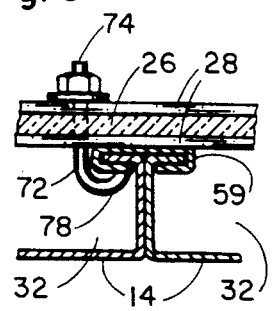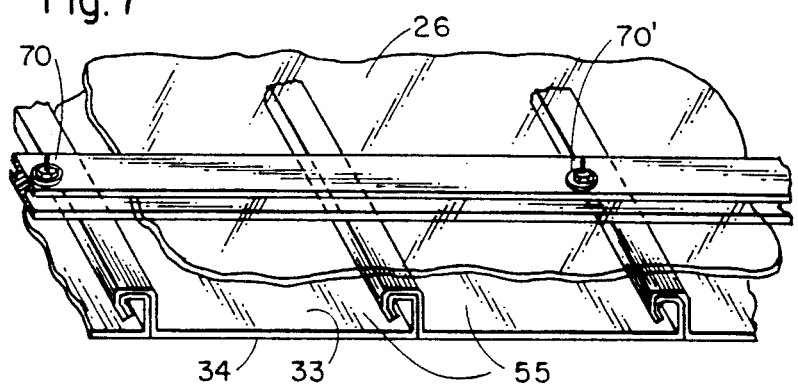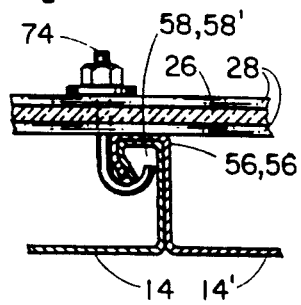

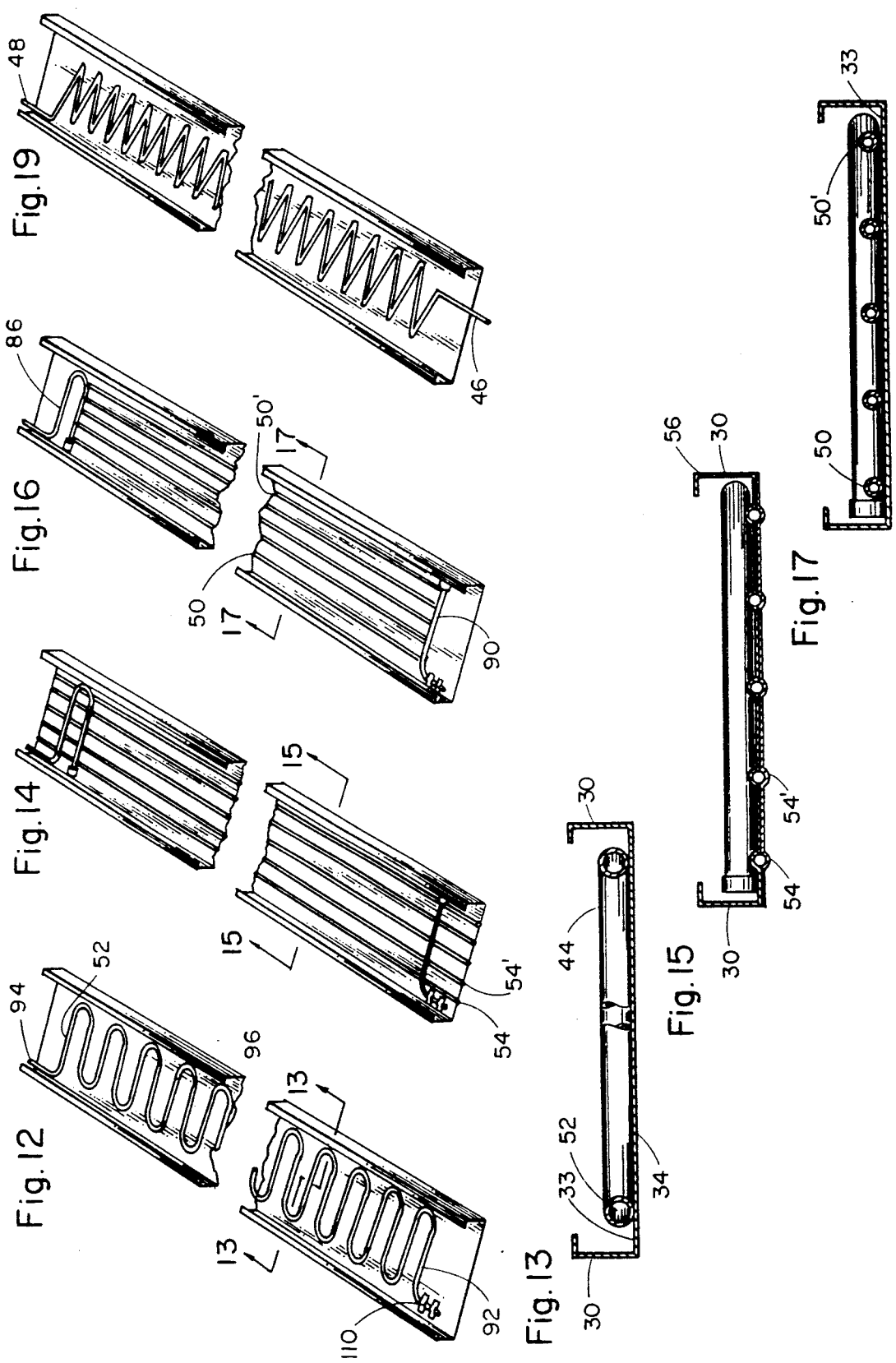

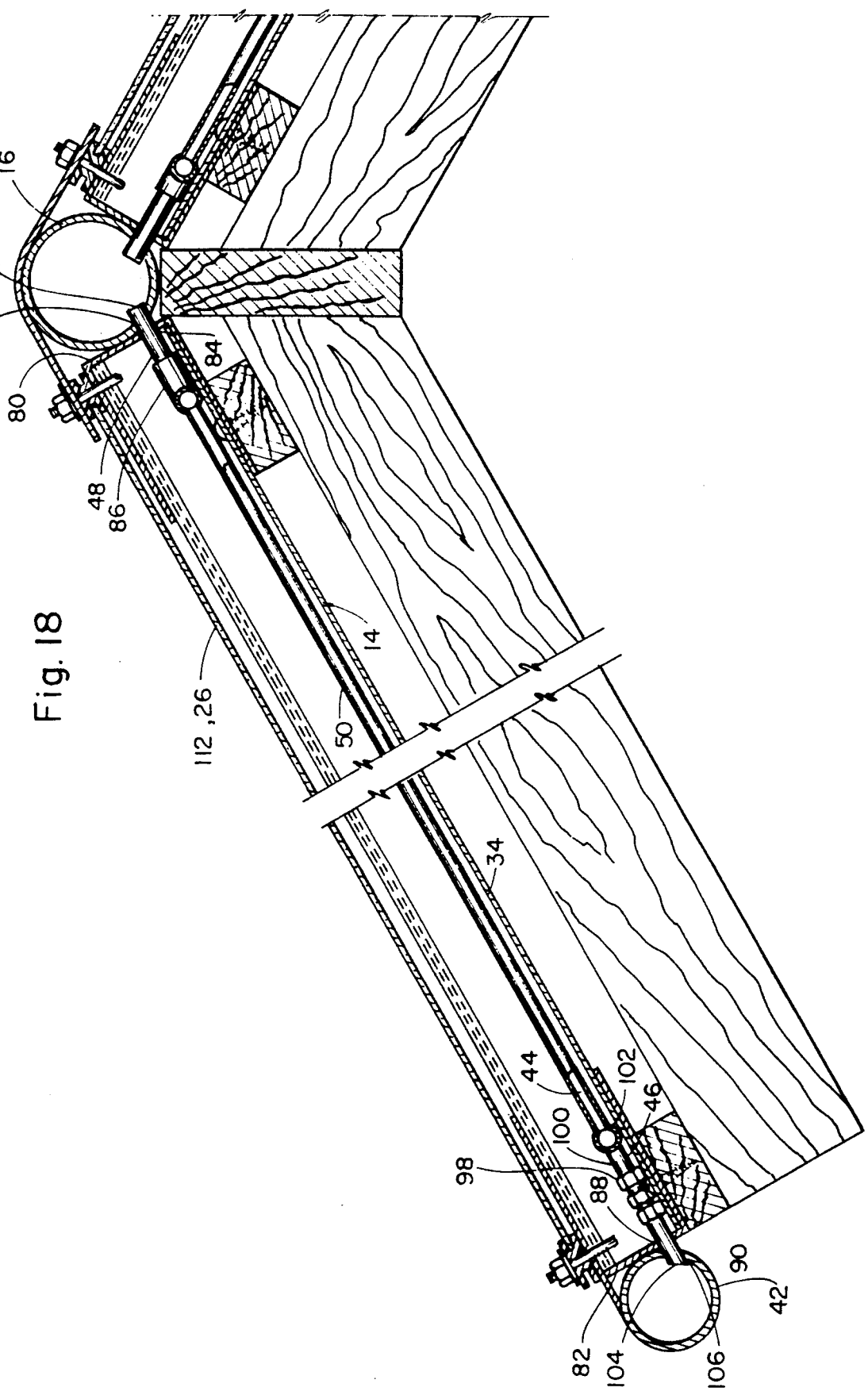

SOLAR ROOFING SYSTEM

BACKGROUND OF THE INVENTION

1. Field of the Invention

The present invention relates to a solar roofing system. More particularly, this invention relates to a solar roofing system comprising a series of standard metal roofing panels adapted to work as a solar heat exchange system as well as provide a roof against the elements. The solar roofing system discharges the captured heat into the interior of the building.

The solar roofing system has a preferred embodiment utilizing a air-to-liquid heat exchange system and an alternate embodiment using air-to-air. The air-to-liquid system is preferred for residential settings and the air-to-air system is intended to work in drying of agricultural products. The structure of the panels makes them highly suitable for the direct use of freon or other refrigerants, for solar thermal electrical applications.

The economic viability of this invention is so unique as to make solar absorption air conditioning, refrigeration, and ice making a practical use of the invention. Though absorption cooling is not nearly as efficient as mechanical cooling systems, the direct use of heat rather than electricity in producing the cooling effect finally gives promise of inexpensive commercial and residential cooling systems using the abundant and inexpensive heat source of the new panels.

2. Description of the Background Art

Throughout the United States steps are being taken to improve solar panels which are used to collect the suns rays. Typically, the solar panels collect the suns rays and transfer the solar energy to a storage reservoir for subsequent discharge of the solar energy for heating a residence or drying agricultural products.

Most previous solar panels, with the exception of small panels intended solely for the production of domestic hot water, have been made up from a number of different materials and have to be fabricated on the jobsite in order to obtain a satisfactory interface with the other building components, particularly the roofing components. This has tended to increase the cost of the solar panels and has deterred many people from installing a solar heating system because of the extremely high initial investment. This is particularly true when one looks at the cost of a solar heating system in relation to the alternative cost of a conventional heating system to heat a home.

U.S. Pat. No. 4,305,384 issued to Proven discloses a solar panel comprising a closed body of thermally insulated material and a transparent surface to form a solar heat exchange area.

U.S. Pat. No. 2,594,232 issued to Stockstill discloses a solar heat exchanger with integrated serpentine tubing, a glass cover and means to connect a plurality of modules. U.S. Pat. No. 2,594,232 discloses a heater and exchanger which make up an additional building component, not part of the integral part of the roofing system.

U.S. Pat. No. 4,085,728 issued to Tomchak discloses a solar panel with integrated serpentine tubing and means to connect a plurality of modules.

U.S. Pat. No. 4,059,095 issued to Grundmann, et al discloses a solar panel with integrated serpentine tubing and the ability to use air or water as a heat exchange medium.

U.S. Pat. No. 4,153,037 issued to Isaacson discloses a solar panel with a glass cover and means to connect a plurality of modules and the ability to use either air or liquid as a solar heat exchange medium. The modular units are portable and as such, can not be considered a part of a structural building component such as a roof.

U.S. Pat. No. 4,308,858 issued to Skillman discloses a solar energy collecting apparatus that utilizes air only as the heat exchange medium. The apparatus is comprised of a plurality of a sheet metal roofing panels whose principle role is to provide a weather membrane for the underlying building. U.S. Pat. No. 4,308,858 teaches away from the use of standard factory assembled solar roofing panels. Contrariwise, the invention discloses the use of a jobsite fabricated roofing panel using both forming and rolling machinery that is commonly available in the roofing industry.

Prior patents have only provided a partial solution to the general overall problem of providing a factory assembled, low cost solar roofing panel that is economic for a homeowner when constructing a dwelling.

Therefore it is an object of this invention to provide a solar roofing panel that is made from a standard metal roofing panel of the standing "T" type, or other common types.

It is a further object of the invention to provide a solar roofing panel that is easily maintainable in the field for repairing broken glass sheets or maintaining the tubular connections to the distribution manifold and the collection header.

It is a still further object of the invention to provide a solar roofing panel that will be a building component substitute for a standard metal roof panel.

It is a further object of the invention to provide a solar roofing panel that can be fabricated in a manufacturing facility to insure close manufacturing tolerances and achieve the economies of cost inherent in a factory setting, as opposed to fabricating a solar roofing panel on the jobsite where costs are highly variable.

It is a further object of the invention to provide the solar roofing panel with the hardware to allow the collectors to be readily accessed for maintenance of the solar heat exchange zone.

It is a still further object of the invention to provide a solar roofing panel that the metal roofing industry trades can readily install in a residential setting without additional training of the roofing mechanics.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure.

Accordingly, other objects and a fuller understanding of the invention may be had by referring to the summary of the invention and the detailed description of the preferred embodiments in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated into a building with a metal roofing system to collect and supply thermal energy from the sun to heat the interior thereof, and provide solar generated electricity, and provide a thermal energy source for absorption cooling for supermarkets, and the like. The solar roofing system is comprised of a plurality of standard metal roofing panels and a transparent glass sheet that form a solar heat exchange zone for a heat exchange fluid to flow through and transfer solar energy from the sun to the solar roofing panels.

A collection header is provided at the upper end of each solar roofing panel to collect the heat exchange fluid after it traverses the solar heat transfer zone.

The preferred embodiment is an air-to-liquid system wherein the heat exchange fluid is a liquid and the solar heat transfer zone comprises a series of tubes for the flow of the heat exchange fluid therethrough. In addition, a distribution manifold transversely disposed on the lower end of each roofing panel is provided to discharge the heat exchange fluid into the solar heat transfer zone.

In addition to the above, a storage tank and a pump and a plurality of radiators located within the building is provided to complete the closed loop heat exchange path for the heat exchange fluid. The entire apparatus is controlled by thermostatic means. The building would be considered a residential setting. The tubular pathway can be a serial serpentine form with all the heat exchange fluid flowing through a single tube, or it can be comprised of a plurality of parallel disposed tubes with a tubular entry manifold and a tubular discharge manifold to distribute the heat exchange fluid among the plurality of parallel disposed tubes.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 3 is a perspective view showing the attachment of the glass sheet to the Batten lok type solar roofing panel and the "H" shaped crossrail therebetween.

FIG. 4 is a transverse cross-sectional view showing the method of attachment utilizing fasteners on the Batten Lok type of roofing panel.

FIG. 5 is a perspective view showing the attachment of the glass sheet to the Standing 'T' type solar roofing panel and the "H" shaped crossrail therebetween.

FIG. 6 is a transverse cross-sectional view showing the method of attachment utilizing fasteners on the standing 'T' type of roofing panel.

FIG. 7 is a side sectional view showing the attachment relationship of the lateral walls, glass sheet, crossrail, and fastener.

FIG. 8 is a perspective view showing the attachment of the glass sheet to a roofing panel that uses the Pittsburgh seam or other mechanically rolled seams and the "H" shaped crossrail therebetween.

FIG. 9 is a transverse cross-sectional view showing the method of attachment utilizing fasteners on the Pittsburgh seam type of roofing panel.

FIG. 12 is a perspective view of the alternative embodiment of the serial arcuate serpentine solar roofing panel.

FIG. 13 is a transverse cross-sectional view of the serial serpentine arcuate solar roofing panel.

FIG. 14 is a perspective view of the parallel intricately formed tubular pathway solar roofing panel.

FIG. 15 is a transverse sectional view of the parallel integrally formed solar roofing panel.

FIG. 16 is a perspective view of the parallel rigidly attached solar roofing panel.

FIG. 17 is a transverse cross-sectional view of the parallel rigidly attached solar roofing panel.

FIG. 18 is a transverse cross-sectional view showing the preferred embodiment configuration.

FIG. 19 is a perspective view of the triangularly positioned tubular pathway solar roof panel.

Similar reference characters refer to similar parts throughout the several views of the drawings.

DETAILED DESCRIPTION OF THE PREFERRED EMBODIMENT

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of structures and the combination and arrangement of parts may be resorted to without departing from the spirit and scope of the invention.

Figure 1:
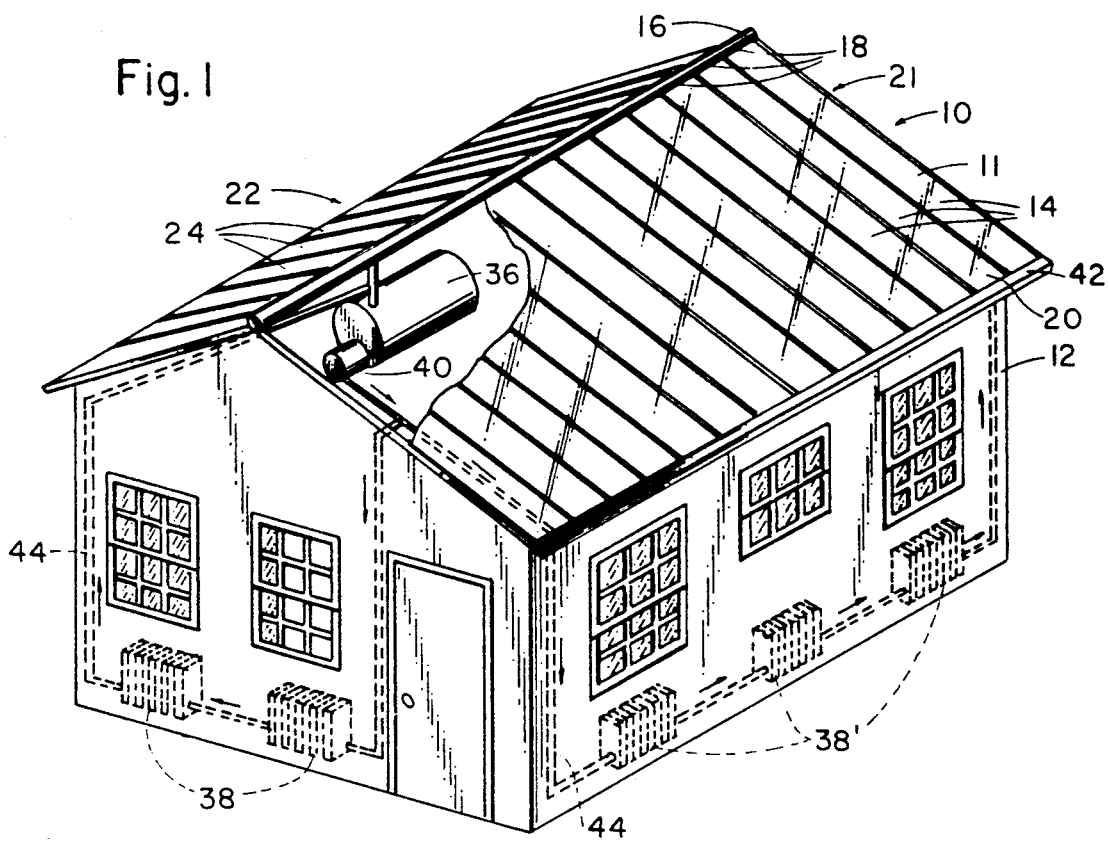
FIG. 1 is a perspective view of the preferred embodiment showing the air-to-liquid system in a residential setting.

Referring to FIG. 1, a solar metal roofing panel system 10 is shown fully assembled as part of a roof 11 on a building 12. A plurality of solar roofing panels 14 are oriented below a collection header 16 that runs transversely across an upper end 18 of each solar roof panel 14. The collection header 16 gathers a heat exchange fluid 19 after the fluid 19 traverses the roofing panel 14 from a lower end 20 to the upper end 18 of the roofing panel 14.

In those locations where the building 12 can be located properly with respect to the sun, the solar roofing panel system 10 can be installed on only one side 21 of the roof 11, the other side 22 can use conventional metal roofing panels 24 of the Standing "T", Batten lok, Pittsburgh seam, or the like.

Each solar roofing panel 14 comprises one standard metal roofing panel 24 of the Pittsburgh seam, standing "T", or Batten lok type, a removable transparent glass sheet 26, and an "H" shaped crossrail 28 therebetween. The "H" shaped crossrail 28 rests on a pair of upstanding lateral walls 30 of the solar roofing panel 14. As best seen in FIGS. 3, 5 and 7 the solar roofing panel 14 forms a rectangular solar heating transfer zone 32 for urging transfer of the solar energy to the heat exchange fluid 19. An interior surface 33 of a metal base plate 34 of each solar roofing panel 14 is painted black to enhance the heat exchange process.

In the air-to-liquid embodiment, the heat exchange fluid 19 is a liquid and is collected in the collection header 16 and stored in a storage tank 36. The storage tank 36 is connected to a plurality of radiators 38,38' for subsequent heating of an interior space 39. The solar metal roof panel system 10 has a pump 40 to move the heat exchange fluid 19 through the radiators 38,38' and return the heat exchange fluid 19 to a distribution manifold 42 located transversely along the lower end 20 of the solar roofing panels 14 for recycling the heat exchange fluid 19 through the solar heating transfer zone 32. The solar metal roof panel system 10 is controlled by a thermostat 43.

Each solar roofing panel 14 has a tubular pathway 44 rigidly attached to the interior surface 33 of the metal base plate 34. A first end 46 of the tubular pathway 44 is connected to the distribution manifold 42, and a second end 48 is connected to the collection header 16, as can be best seen in FIG. 18. The tubular pathway 44 has a plurality of parallel tubes 50,50' as seen in FIG. 16, or a single serial tube 52 as best seen in FIG. 12. In the case of the single serial tube 52, the tubular pathway 44 can be arcuate as seen in FIG. 12 or triangular as seen in FIG. 19.

An alternative embodiment for the parallel tubes 50,50' is for a plurality of parallel tubes 54,54' to be formed internally within the base plate 34 of the solar roofing panel 14. As best seen in FIG. 15, this embodiment eliminates the need to rigidly attach the parallel tubes 50,50' to the interior surface 33 of the metal base plate 34.

The single serial tube 52 has an arcuate serpentine shape as best seen in FIG. 12. An alternative embodiment of the single serial tube 52 has an acute triangular shape as best seen in FIG. 19.

The solar roofing panels 14 are fabricated in a remote plant similar to a plant that fabricates the standard metal roofing panels 22. Each solar roofing panel 14 has the metal base plate 34 and the pair of upstanding lateral parallel walls 30 on the periphery of the metal base plate 34 for forming an open chute 55. The transparent glass sheet 26 is coupled to the pair of upstanding lateral walls 30 to close the top of the open chute 55 and confine the flow of the heat exchange fluid 19 through the now closed chute 55.

The upper edge 56 of each lateral wall 30 has a channel 58 adapted to couple to a channel 58' on the upper edge 56' of a lateral wall 30' of the adjacent roofing panel 14'. This coupling prevents roof leaks between adjacent roofing panels 14, 14'. The preferred embodiment of the solar roofing panel 14 is a standing "T" panel as best seen in FIG. 5. A channel joiner 59 is used to couple the channels 58,58' for the standing "T" embodiment, as best seen in FIG. 6. Alternatively, the solar roofing panels 14 with the Pittsburgh seam or the Batten lok can be used, as best seen in FIG. 3 and 7, respectively. The collection header 16 gathers the heat exchange fluid 19 after it traverses the closed chute 55 for subsequent heating of the interior 39 of the building 12.

Figure 2:
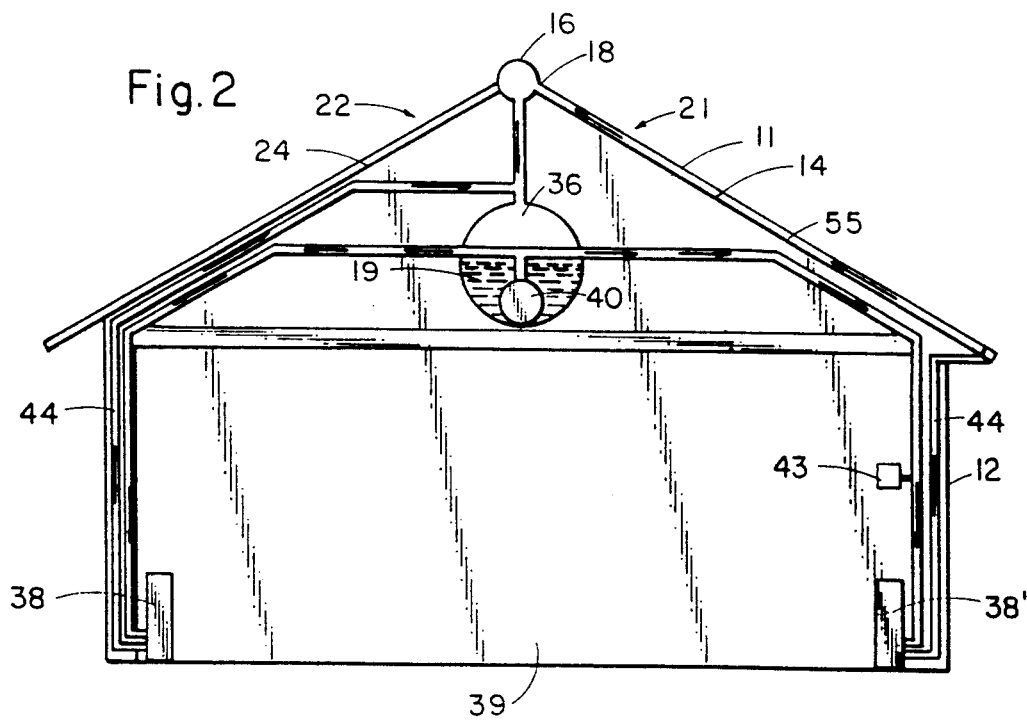
FIG. 2 is a transverse cross-section of the preferred embodiment showing the piping schematic and the flow of the heat exchange fluid in the closed loop cycle.
Figure 10:
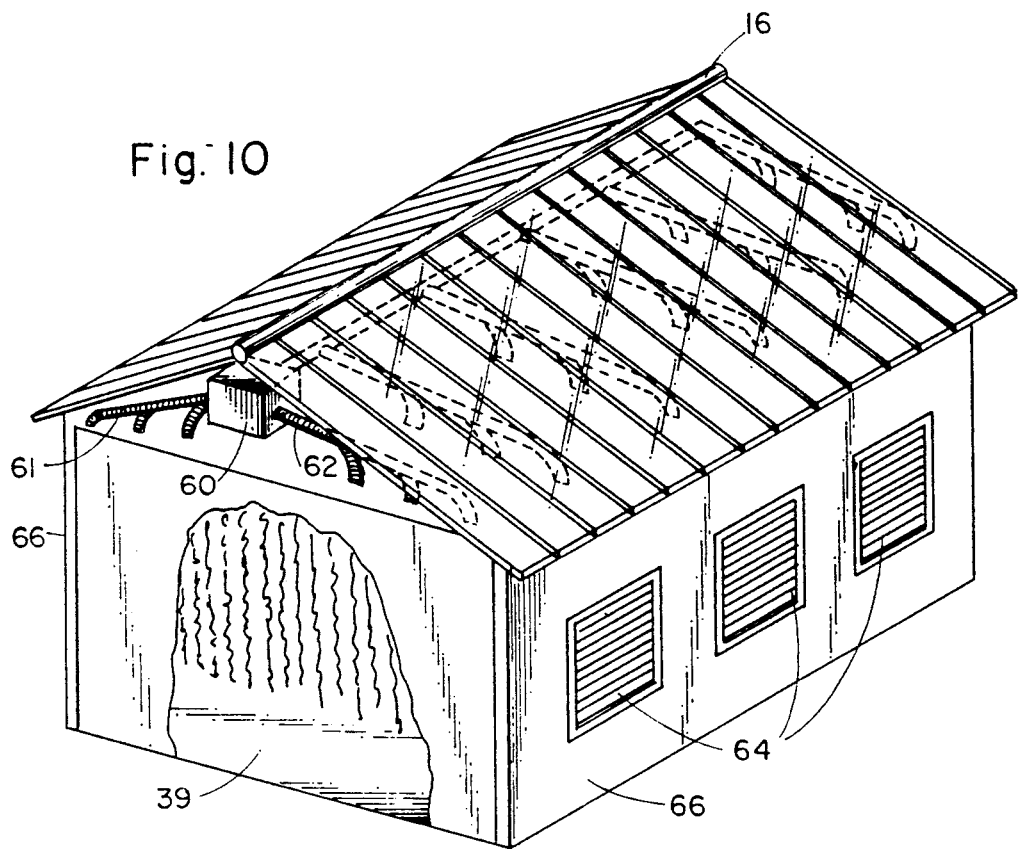
FIG. 10 is an alternative embodiment of the invention utilizing the air-to-air system in an agricultural drying setting.

As best seen in FIG. 2, the pump 40, the storage tank 36, the plurality of radiators 38,38', and the distribution manifold 42 are employed in a closed loop heat exchange cycle. The heat exchange fluid 19 is a liquid, preferably ethylene glycol, commonly called antifreeze. The heat exchange fluid 19 is recycled repeatedly through the distribution manifold 42, upwardly through the tubular pathway 44, in the closed chute 55, and then to the collection header 16 where the heat exchange fluid 19 is pumped to the storage tank 36 for subsequent discharge to the plurality of radiators 38,38' wherein the heat exchange fluid 19 gives up the solar heat energy gained traversing the tubular pathway 44.

Figure 11:
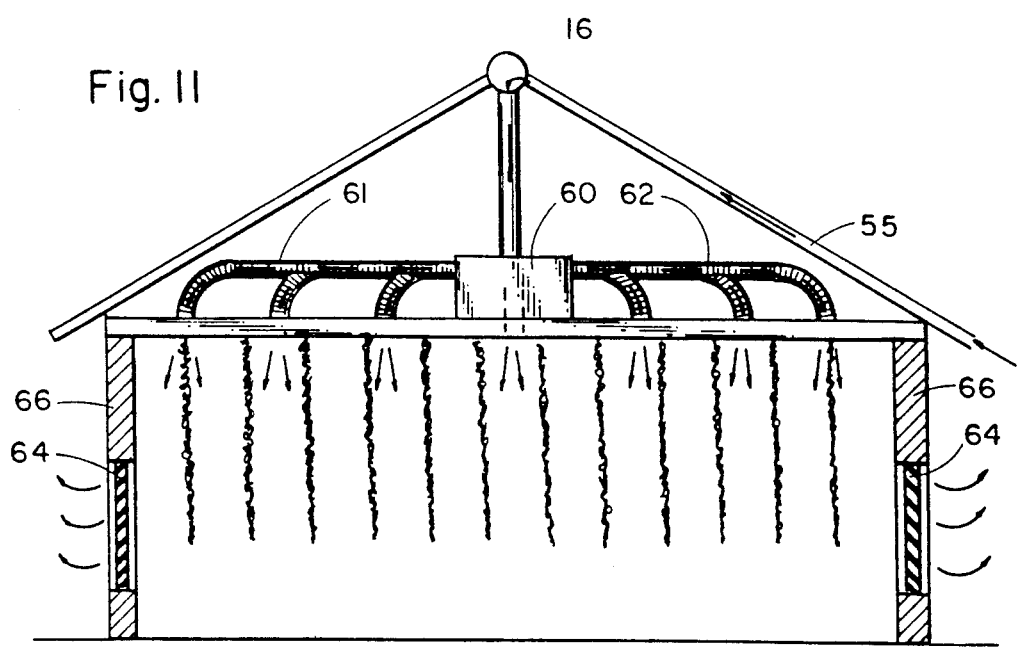
FIG. 11 is a transverse cross-sectional view of the air-to-air alternative embodiment showing the distribution of the solar heated fluid and its path through a plurality of louvers to the outside atmosphere.

As best seen in FIG. 11, a fan 60 is employed to move a gaseous heat exchange fluid 61 from the collection header 16 and distribute the gaseous heat exchange fluid 61 to the interior 39 of the building 12 through a plurality of distribution ducts 62. A plurality of louvers 64 in a plurality of side walls 66 of the building 12 allow the gaseous heat exchange fluid 61 to vent to the atmosphere after giving up the solar heat energy gained traversing the closed chute 55. In effect, this is an open loop heat exchange cycle as the gaseous heat exchange fluid 61 only traverses the closed chute 55 once.

The "H" shaped crossrail 28 is adapted to slidably receive an edge 68 of a plurality of the transparent glass sheets 26. The crossrail 28 is positioned transversely on the upper edge 56 of the lateral wall 30 and is adapted with a plurality of spaced apart apertures 70,70' to receive an arcuate fastener 72 for coupling the "H" shaped crossrail 28 to the upper edge 56 of the lateral wall 30. The typical fastening arrangement for the Pittsburgh seam and the standing "T" Batten lok can be best seen in FIGS. 4, 6 and 8, respectively. The arcuate fasteners 72 have an elongated first end 74 adapted for passage through the aperture 70 in the "H" shaped crossrail 28 supporting the transparent glass sheet 26 and the first end 74 further being adapted for threadable engagement with a bolt 76. A second end 78 is arcuate shaped for engagement with the upper edge 56 of the lateral wall 30 of the solar roofing panel 14, as best seen in FIG. 9.

As best seen in FIG. 18 each solar roofing panel 14 is fitted with a pair of spaced-apart transverse end caps 80,82 to enclose the solar roofing panel 14 and protect it from the weather. The upper transverse end cap 80 has an aperture 84 for a tubular exit manifold 86 to pass through to connect to the collection header 16. The lower transverse endcap 82 has an aperture 88 for a tubular entry manifold 90 to pass through to connect to the distribution manifold 42.

An important feature of the invention is that the cross sectional area of the collection header 16 should be approximately 120% of the sum of the cross sectional areas of all of the parallel tubes 50 or the internally formed parallel tubes 54, that are connected to the collection header 16 through a plurality of tubular exit manifolds 86. Also, it is important to maintain the proper ratio of the diameters of the tubular entry manifold 90 and the tubular exit manifold 86, to the diameter of the individual tubes 50, or the diameter of the internally formed tubes 54 at approximately 2.0. For example, if the diameter of the individual tube 50 is 0.75 inches, the diameter of the tubular entry manifold 90 and the tubular exit manifold 86 should each be about 1.5 inches.

In the single serial tube case, the diameter of a first end 92 of the tube 52, the diameter of a second end 94 and the diameter of the single tube 52 therebetween should be approximately equal.

As best seen in FIG. 18, a mechanical pigtail connection 98 having a first end 100 is connected to a lower end 102 of the tubular entry manifold 90 and has a second end 104 connected to an aperture 106 in the distribution manifold 42 for urging fluid flow communication between the tubular pathway 44 and the distribution manifold 42. An upper end 108 of the tubular exit manifold 86 is in threadable fluid flow communication with the collection header 16 through an aperture 109.

The serial tube 52 has a lower end 110 adapted to receive the first end 100 of the mechanical pigtail connection 98 and the second end 104 of the pigtail connection 98 is in fluid flow communication with the distribution manifold 42 through the aperture 106 in the distribution manifold 42. The second end 94 of the serial tube 52 is in threadable fluid flow communication with the collection header 16 through an aperture 109.

The invention can be readily adapted to produce electricity directly through photovoltaics. A non-illustrated semi-translucent photovoltaic panel 112 having the same physical dimensions as the transparent glass sheet 26 is substituted on the solar roofing panel 14. This approach retains the ease of replacing a broken glass sheet 26 or malfunctioning photovoltaic panel 112. The loss in solar energy transmitted to the heat exchange zone 32 due to the semi-translucence of the photovoltaic panel 112 is offset by the direct production of electricity to power the usual compliment of household appliances. The sizing and mix of transparent glass sheets 26 and semi-translucent photovoltaic panels 112 is based on many factors including location, reliability and access to central station electricity, weather conditions, and other factors.

Figure 20:
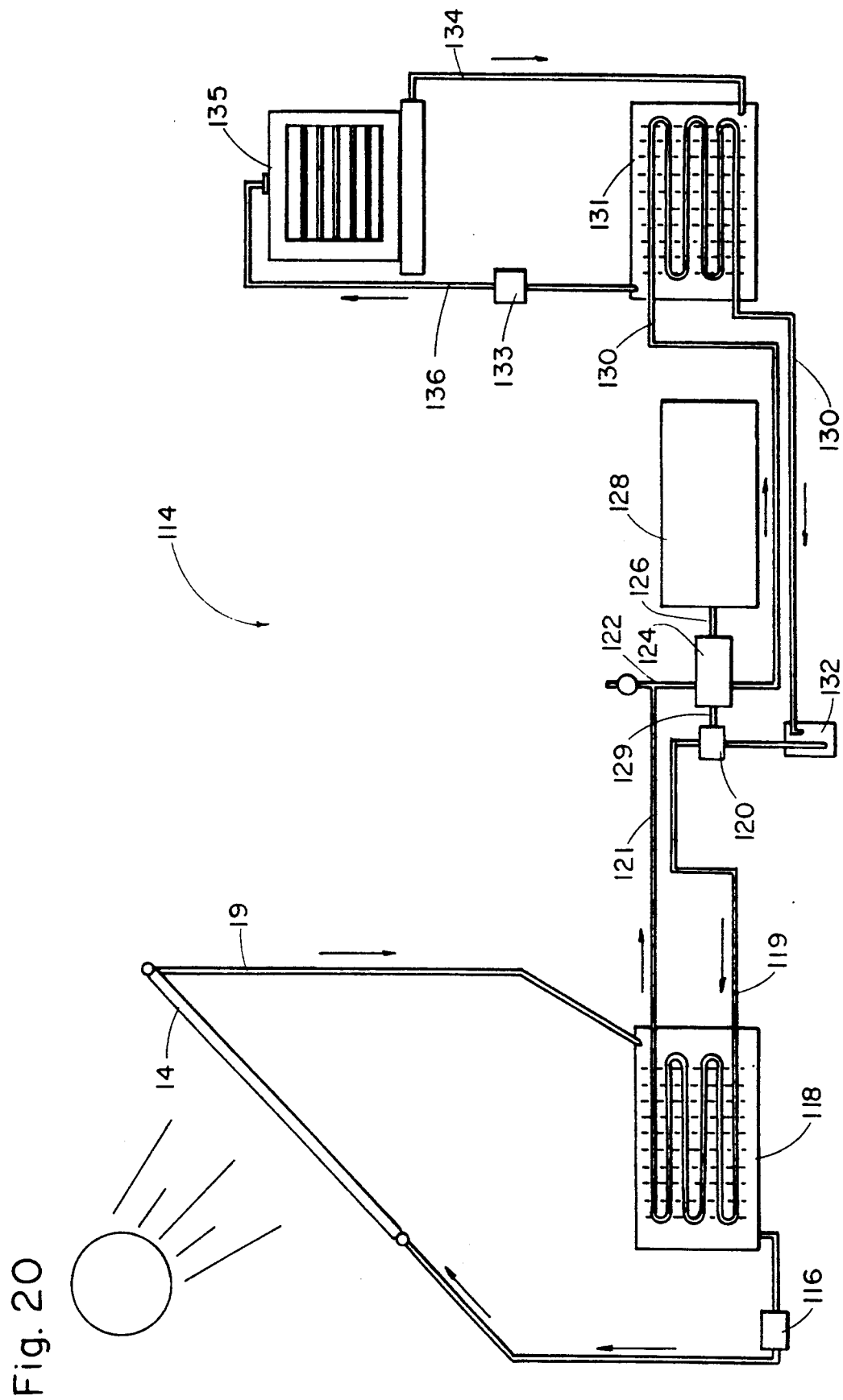
FIG. 20 is schematic diagram of a solar collector system in which roof panels are combined with turbine to produce electricity.

As best seen in FIG. 20, the solar roof panels 14 can also be incorporated into a system 114 to generate electricity. The electric power generation system 114 comprises a plurality of the solar roof panels 14 and a circulating pump 116 to propel the heat exchange fluid 19 in a closed loop cycle of operation. The heat exchange fluid 19 is preferably a liquid, for example, ethylene glycol, commonly called anti-freeze.

The additional system components to generate the electricity comprise a high pressure heat exchanger 118 for containing a high pressure fluid 119 to absorb the heat from the heat exchange fluid 19 after its traverse through the solar roof panels 14. The high pressure fluid 119 is propelled by a feed pump 120 through a first piping network 121. The high pressure fluid 119 is converted to a vapor 122 in the high pressure heat exchanger 118. Thereupon, the high pressure vapor 122 enters a turbine 124 to urge rotation of the turbine 124. A first shaft 126 connects the turbine 124 to a conventional electric generator 128 for generating electric power and a second shaft 129 is connected to the feed pump 120 for providing motive power thereto.

When the vapor 122 exits the turbine 124, it travels through a second piping network 130 to a cooling tank 131 where the vapor 122 is condensed back into the liquid 119. The liquid 119 is stored in a sump 132 for reuse. The feed pump 120 boosts the pressure on the liquid 119 back to a high pressure state. A coolant pump 133 propels a coolant fluid 134 from the cooling tank 131 to a cooling tower 135 through a third piping network 136 and returns the coolant fluid 134 to the cooling tank 131 to absorb more heat energy from the vapor 122.

The electric power generation system 114 will allow individuals who reside in remote locations, without centrally generated and distributed electric power to enjoy the conveniences afforded by having electricity available to power the usual complement of household appliances.

In many remote locations throughout the world, the only method available to generate electricity is through the use of a non-illustrated fossil fuel powered motor 140. The solar roofing electric power generation system 114 can be retrofitted to the generator 128 by merely adding the solar roofing panels 14, the cooling tank 131, the sump 132, the cooling tower 135, the second piping network 130, the associated coolant pump 133, the third piping network 136, the turbine 124, the high pressure heat exchanger 118, and its associated feed pump 120 and the first piping network 121. The electric power generation system 114 would become the primary source of generating electric power during sunny days. In the evening, or when the sun is obscured by clouds, the fossil fuel powered motor 140 would be turned on to continue the supply of electricity to the home.

Now that the invention has been described:
What is claimed is:
1. A house with apparatus for collecting and supplying thermal energy from the sun to the interior thereof, the house having generally vertical sidewalls with a plurality of apertures and a roof, the apparatus comprising:
 a roofing system coupled to the sidewalls and located thereabove, the roofing system having a generally central portion at an elevated orientation;
 a plurality of metal roofing panels angularly disposed below the central portion for urging flow of a liquid heat exchange fluid therethrough, each roofing panel having a rectangular cross sectional configuration with a metal base plate therebeneath and a glass sheet thereabove in a spaced-apart parallel relationship to define a solar heating transfer zone therebetween, the zone adapted to confine the movement of the heat exchange fluid therethrough, the glass sheet adapted to effect the transmission of solar energy therethrough to the heat exchange fluid flowing for being trapped between the metal base plate therebeneath and the glass sheet thereabove, the glass sheet thereabove being transparent and the metal base plate therebeneath being coated a dark color for absorbing solar energy whereby the transmitted and trapped thermal energy is transferred to the heat exchange fluid through the glass sheet and the balance of the thermal energy is absorbed by the dark metal plate therebeneath and retained therein for maximum efficiency, each roofing panel further having paired, upstanding parallel lateral walls and paired transverse end caps in a spaced apart opposed relationship for forming a box-like unit, each end cap being attached to an edge of the paired upstanding parallel lateral walls;

a collection header in fluid flow communication with an upper end of each roofing panel for collecting the heat exchange fluid;

a plurality of radiators located within the house adjacent the sidewalls;

a storage tank therein below the collection header;

a fluid transfer piping network therebetween the roofing panels and the radiators for moving the liquid heat exchange fluid in a closed loop therein; and pumping means to move the heat exchange fluid through the solar heating transfer zone.

2. The apparatus as set forth in claim 1 wherein the building is a shed for the drying of agricultural products with the plurality of apertures in the sidewalls to move the air therethrough in an open cycle of operation, and further wherein the heat exchange fluid is air, and still further wherein the means for moving the heat exchange fluid is a fan.

3. The apparatus as set forth in claim 1 wherein the building is a house having a plurality of radiators located within the building adjacent the sidewalls and a storage tank therein below the collection header and the heat exchange fluid is a liquid moveable in a closed loop between the roofing panels and the radiators via a fluid transfer piping network therebetween, and further wherein the means to move the heat exchange fluid through the solar heating transfer zone is a pump for propelling the liquid, and further including thermostatic means to control the system, and still further including a distribution manifold in fluid flow communication with a lower end of each roofing panel for discharging the heat exchange fluid.

4. The apparatus as set forth in claim 3 wherein each roofing panel has a tubular pathway rigidly attached to a surface of the metal base plate within the solar heating transfer zone, the tubular pathway adapted to convey the liquid, and having a tubular entry manifold, a tubular exit manifold and a plurality of tubes therebetween to form a parallel path for movement of the liquid therethrough.

5. The apparatus as set forth in claim 4 wherein the tubular pathway is formed within the metal base plate of each roofing panel to define a plurality of internal, parallel tubes for the movement of the liquid therethrough.

6. The apparatus as set forth in claim 3 wherein each roofing panel has a tubular pathway rigidly attached to a surface of the metal base plate within the solar heating transfer zone, the tubular pathway having a first end adapted for urging entry of the heat exchange fluid and a second end adapted for urging discharge of the heat exchange fluid, and a single tube therebetween forming a serial path for the movement of the liquid therethrough.

7. The apparatus as set forth in claim 6 wherein the serial path is a continuous, cyclic serpentine pathway with arcuate edges along the metal base plate.

8. The apparatus as set forth in claim 6 wherein the serial path is a continuous cyclic triangular pathway with acute angular edges along the metal base plate.

9. The apparatus as set forth in claim 5 or claim 7 wherein the tubular pathway further includes an upper end projecting a short distance beyond an outer edge of the metal base plate of the roofing panel for urging threadable connection of the tubular pathway to the collection header and a lower end of the tubular pathway being adapted with a mechanical pigtail connection for urging fluid flow communication with the distribution manifold.

10. A solar energy thermal collection roof assembly for use as a roofing panel and a solar heating system on a building comprising:

a plurality of metal roofing panels of the standing 'T' type, each roofing panel having a metal base plate painted a dark color for absorbing solar thermal energy, and paired upstanding parallel lateral walls forming a three sided imperforate channel with the lateral walls extending generally vertically a short distance with respect to the width of the metal base plate and with the width being a short distance with respect to the length of the metal base plate for defining an open chute for the flow of a heat exchange fluid thereon;

a plurality of transparent glass sheets, each glass sheet coupled with respect to the upper edges of the upstanding lateral walls of each roofing panel for enclosing the chute and confining the movement of the heat exchange fluid therethrough;

hardware means to couple each glass sheet and metal roofing panel in a spaced apart relationship;

a channel on an upper edge of each lateral wall with means for coupling each channel in a side-to-side relationship with the channel of the adjacent roofing panel to define a roof structure wherein the thermal collection roof assembly constitutes the roof of a building, and further including a collection header in fluid flow communication with each metal roofing panel for gathering the heat exchange fluid at an upper end of the chute after traversing the enclosed chute;

a pump for moving the heat exchange fluid through the lower end of the chute of each metal roofing panel; and a distribution manifold in fluid flow communication with the lower end of the chute of each metal roofing panel for urging the heat exchange fluid to traverse the chute, and still further including storage means to hold the heat exchange fluid.

11. The roof assembly as set forth in claim 10 wherein the means to move the heat exchange fluid through the lower end of the chute of each metal roofing panel is a fan adapted for withdrawing the heat exchange fluid from the collection header.

12. The roof assembly as set forth in claim 10 wherein the hardware means further includes a plurality of "H" shaped members, each "H" shaped member is disposed horizontally and perpendicular to and on top of the channels for urging slidable insertion and removal of the glass sheets, each "H" shaped member further having spaced apart apertures adapted for receiving a fastener, and having lateral internal recesses therealong for receiving the edges of the glass sheet and for holding the glass sheet in a spaced-apart relationship with the metal base plate for defining therebetween a path for the flow of heat exchange fluid.

13. The roof panel as set forth in claim 12 wherein each fastener has a first end adapted for urging threadable communication with a nut, and an arcuate shaped second end for urging coupling with an upper portion of the upstanding walls of the channel.

14. The roof assembly as set forth in claim 10 wherein each roofing panel further includes a pair of transverse endcaps in a spaced-apart opposed relationship, each endcap being attached to an edge of one of the upstanding parallel lateral walls for forming a box-like unit, the upper transverse endcap further having an aperture for urging fluid flow communication between the collection header and a tubular pathway, and the lower transverse endcap further having an aperture for urging fluid flow communication between the distribution manifold and the tubular pathway.

15. The roof assembly as set forth in claim 10 wherein the plurality of metal roofing panels is of the Pittsburgh seam type.

16. The roof assembly as set forth in claim 10 wherein the plurality of metal roofing panels is of the Battenlok seam type.

* * * * *